United States Patent [19]

Dimanshteyn

[11] Patent Number: 5,035,951
[45] Date of Patent: Jul. 30, 1991

[54] FIRE RESISTANT COATINGS

[75] Inventor: Felix A. Dimanshteyn, West Hartford, Conn.

[73] Assignee: Firestop Chemical Corporation, Georgetown, Mass.

[21] Appl. No.: 389,313

[22] Filed: Aug. 2, 1989

Related U.S. Application Data

[63] Continuation-in-part of Ser. No. 260,400, Oct. 20, 1988, Pat. No. 4,871,477, which is a continuation-in-part of Ser. No. 230,054, Aug. 9, 1988, abandoned.

[51] Int. Cl.⁵ .................. B32B 13/04; C09K 21/02; C09D 5/18
[52] U.S. Cl. ................ 428/446; 428/448; 428/450; 428/452; 428/453; 428/921; 252/606; 252/607; 252/609; 106/18.12
[58] Field of Search ............ 106/18.11, 18.12; 252/606, 607; 428/921

[56] References Cited

U.S. PATENT DOCUMENTS

| | | | |
|---|---|---|---|
| 1,271,506 | 7/1918 | Ferguson | 252/606 |
| 2,509,599 | 5/1950 | Hollenberg | 106/18.11 |
| 3,262,964 | 7/1966 | Rust et al. | 260/465.7 |
| 3,317,433 | 5/1967 | Eichel | 252/316 |
| 3,493,401 | 2/1970 | Schutt | 106/18.11 |
| 3,639,299 | 2/1972 | MacDowall | 260/2.5 FP |
| 3,699,041 | 10/1972 | Sanderford et al. | 252/8.1 |
| 3,714,047 | 1/1973 | Marion et al. | 252/62 |
| 3,865,760 | 2/1975 | Pitt et al. | 106/18.12 |
| 3,874,889 | 4/1975 | Geppert et al. | 106/288 B |
| 3,963,849 | 6/1976 | Thompson | 428/182 |
| 3,997,700 | 12/1976 | Jacquemin et al. | 428/332 |
| 4,011,195 | 3/1977 | Self | 106/83 |
| 4,043,987 | 8/1977 | Jolicoeur et al. | 260/78.41 |
| 4,066,463 | 1/1978 | Chollet | 106/18.11 |
| 4,089,912 | 5/1978 | Levek et al. | 250/862 |
| 4,095,985 | 6/1978 | Brown | 106/18.11 |
| 4,163,005 | 7/1979 | Albright | 260/45.7 S |
| 4,190,698 | 2/1980 | De Boel et al. | 428/334 |
| 4,216,130 | 8/1980 | Rigge et al. | 260/29.7 R |
| 4,297,252 | 10/1981 | Caesar et al. | 252/606 |
| 4,315,082 | 2/1982 | Beacham et al. | 525/20 |
| 4,514,328 | 4/1985 | Staendeke et al. | 252/609 |
| 4,521,333 | 6/1985 | Graham et al. | 521/907 |
| 4,612,239 | 9/1986 | Dimanshteyn | 428/246 |
| 4,722,945 | 2/1988 | Wood et al. | 521/65 |
| 4,842,772 | 6/1989 | Withiam | 252/607 |

FOREIGN PATENT DOCUMENTS 0139622 12/1978 Japan .................. 252/606

Primary Examiner—Robert L. Stoll
Assistant Examiner—Joseph D. Anthony
Attorney, Agent, or Firm—Lahive & Cockfield

[57] ABSTRACT

Disclosed in an intumescent coating composition comprising an aqueous mixture of a water soluble alkali metal silicate, a hydrated metal silicate clay, and an inorganic particulate material which, when exposed to flame temperatures, endothermically releases a nonflammable gas. The coating can be applied to metal, wooden and foamed polymeric materials and serves to provide a thermal barrier against the effects of overheating.

8 Claims, 2 Drawing Sheets

FIRE RESISTANT COATINGS

REFERENCE TO RELATED APPLICATIONS

This application is a continuation-in-part of copending U.S. application Ser. No. 260,400 filed Oct. 20, 1988, now U.S. Pat. No. 4,871,477 which is a continuation-in-part of copending U.S. application Ser. No. 230,054 filed Aug. 9, 1988, now abandoned.

BACKGROUND OF THE INVENTION

This invention relates to coatings useful for protecting materials against the effects of overheating. More particularly, the invention relates to intumescent coatings which, when exposed to flame temperatures, provide heat absorptive and insulative thermal barriers.

Metals, such as aluminum, iron, and steel, are used in a variety of utilitarian and decorative applications. In particular, these materials are commonly used to provide structural support in, for example, architectural settings and as electrical or fluid conduits. Fire-induced mechanical failure in any one of these applications can have catastrophic consequences. For example, exposure to fire, and the resultant thermal damage, can cause metals to lose mechanical strength compromising building and electrical system safety.

Many coatings have been developed to protect metals against the effects of heat. Notable protective coatings include various intumescent compositions, asbestos-based coatings, and sprayable cement-like materials.

It is an object of the invention to provide an intumescent coating, adapted for use with metallic as well as cellulosic flammable materials, which protects against the adverse effects of fire and heat. Another object is to provide an intumescent coating which shows long term mechanical stability. It is yet another object to provide a fire-protected component having a thermally insulating intumescent coating thereon.

Other general and specific objects of the invention will in part be obvious and will in part appear hereinafter.

SUMMARY OF THE INVENTION

The invention provides coatings which protect against the degenerative effects of overheating and exposure to excessive radiant energy. The coatings comprise a mixture of a water-soluble alkali metal silicate, and at least one inorganic particulate material which, when exposed to flame temperatures, endothermically releases a nonflammable gas and preferably a hydrated metal silicate clay. The water-soluble alkali metal silicate, i.e., sodium silicate, potassium silicate, or a mixture of both, acts as a binder. Preferably, the coating includes both normal and high viscosity grades of the alkali metal silicate. The inorganic particulate material can comprise materials which expand when heated due to the internal generation of a nonflammable gas. Suitable inorganic materials include hydrated aluminum oxides, hydrated borates, carbonates, bicarbonates, and mixtures thereof. The preferred inorganic particulate material is alumina trihydrate. The hydrated metal silicate clay preferably is an hydrated aluminum silicate, in particular, kaolin.

The intumescent coating typically comprises about 40% to 90% of the water-soluble alkali metal silicate, 10% to 60% hydrated metal silicate clay, and 10% to 60% inorganic particulate material(s).

In another aspect the invention provides fire protected materials such as metal structural elements, panels, foamed polymeric materials and wooden objects such as crates and boxes. These fire protected components comprise a metal, cellulosic, or foamed polymeric member having the above-described coating composition affixed to an outer surface. Upon exposure to flame temperatures, the coating protects the substrate by presenting a thermally insulating intumescent barrier and forming a vitreous surface barrier.

Since the coating of the invention is water-leachable, it can also include a second coating of a water insoluble material affixed to an outer surface of the fire protective undercoating. The overcoating can include, for example, a metal sulfate such as calcium sulfate, or any of a variety of water insoluble cement compositions.

The invention will next be described in connection with certain illustrated embodiments, but various modifications, additions and subtractions can be made without departing from the spirit or scope of the claims.

BRIEF DESCRIPTION OF THE DRAWINGS

For a fuller understanding of the nature and objects of the invention, reference should be made to the following detailed description and the accompanying drawings, in which.

DESCRIPTION OF PREFERRED EMBODIMENTS

The invention features coatings which protect against heat transmission upon exposure to high temperatures such as are present in a fire or at flame temperatures. In particular, upon exposure to fire the coatings intumesce and form a thermally insulative barrier layer. Materials coated with the composition of the invention are substantially protected against the damage often sustained upon prolonged exposure to fire and flame temperatures.

Figure 1:
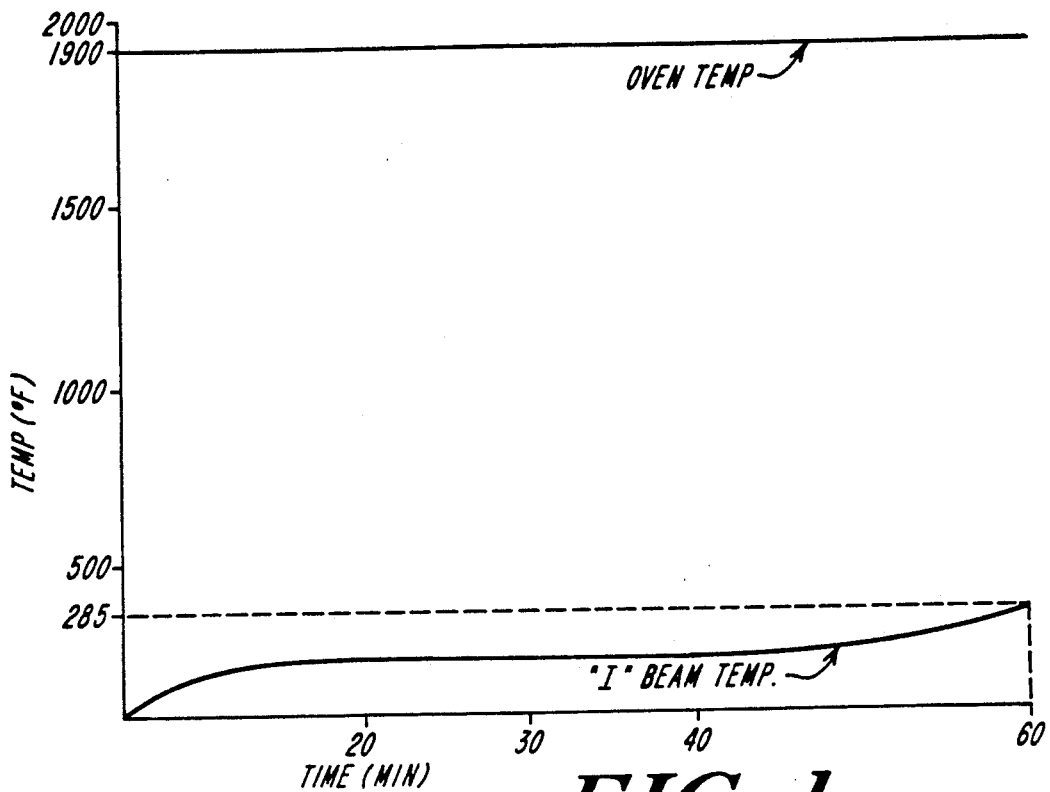
FIG. 1 is a thermal transmission profile (Temperature v. Time) of a steel substrate coated with an 0.45 inch coating embodying the invention.
Figure 2:
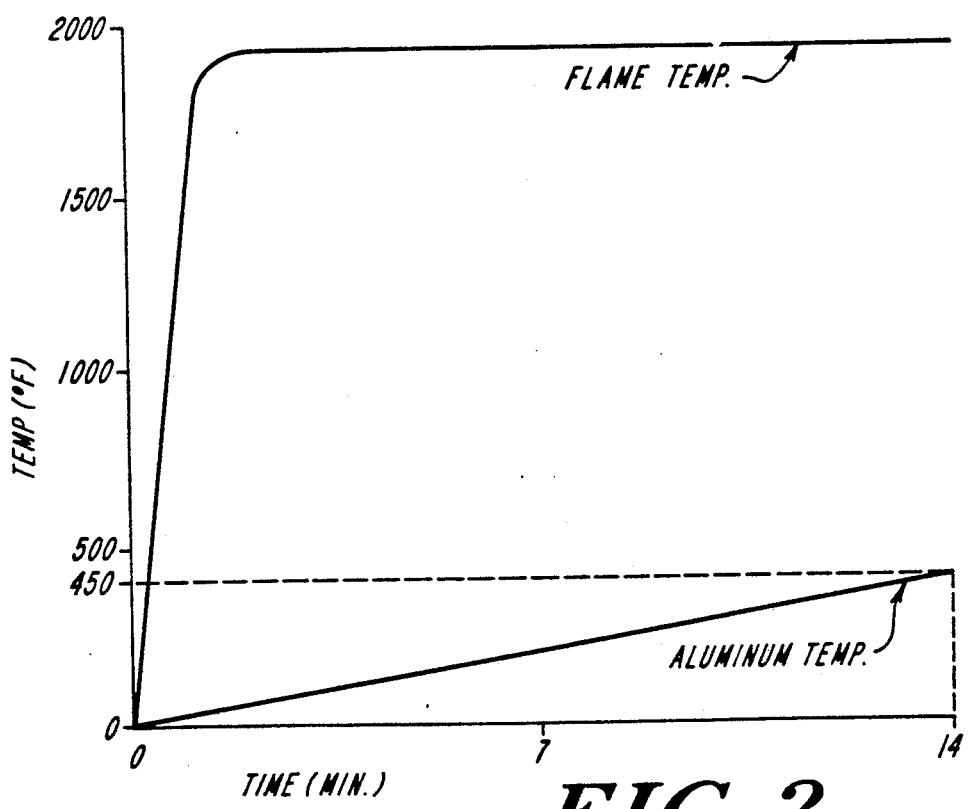
FIG. 2 is a thermal transmission profile of an aluminum substrate having an 0.07 inch coating embodying the invention.
Figure 3:
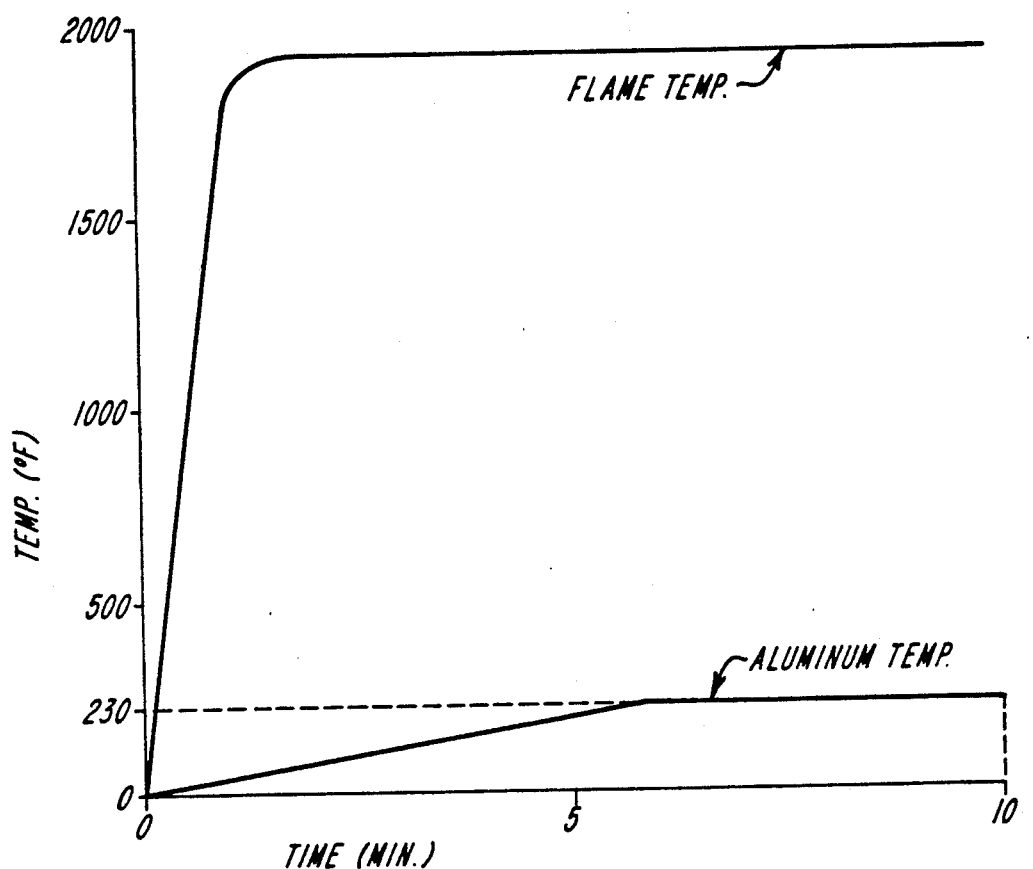
FIG. 3 is a thermal transmission profile of an aluminum substrate having an 0.09 inch coating embodying the present invention.

FIGS. 1, 2, and 3 depict thermal transmission profiles for substrates coated with compositions embodying the invention. Referring to FIG. 1, one plot represents the temperature of an oven used to test a steel "I" beam coated with a 0.50 inch thick layer of a composition embodying the invention. The other plot represents the temperature of the "I" beam over the period of the test. In FIGS. 2 and 3, one plot represents the flame temperature at the point of contact with an aluminum plate coated with a 0.07 and 0.09 inch thick layer of the composition of the invention. The other plot represents the reverse side temperature of the aluminum plate, i.e., the surface temperature on the side of the plate opposite that exposed to the flame. These graphs show that at optimum coating thicknesses, coatings of the invention insulate steel and aluminum substrates for significant periods from heat energy incident on the coating surface.

The coatings of the invention comprise a mixture of a water-soluble alkali metal silicate, at least one inorganic particulate material, e.g., alumina trihydrate or borax, which releases a gas when heated, and preferably a hydrated metal silicate clay.

The coatings contain an alkali metal silicate binder, e.g., sodium silicate and potassium silicate. Typically, the aqueous mixture contains different grades of the silicate compound, in particular, a regular viscosity grade, having a viscosity of about 60 to 1,000 CPS, and a high viscosity grade, having a viscosity of up to 70,000 CPS. Useful regular and high viscosity sodium silicate materials are available from P.Q. Industries of Valley Forge, Pa.

The coating also includes at least one inorganic particulate material which releases a nonflammable gas such as water or carbon dioxide endothermically at high temperatures. In particular, upon exposure to fire, as the temperature rises, the inorganic material absorbs heat and decomposes releasing a nonflammable gas explosively, i.e., via a microexplosion. After the microexplosion, the residue of the inorganic particulate material preferably comprises an oxide or silicate which serves to form a vitreous barrier layer. Examples of reactions that occur include:

(1) $Na_2B_2O_7 \cdot 10H_2O \rightarrow Na_2B_2O_2 + 10H_2O$ (2) $MH_2BO_3 \cdot XH_2O \rightarrow MH_2BO_3 + XH_2O(g)$ (3) $MH_2BO_3 \rightarrow MBO_3 + H_2O(g)$ (4) $2MHCO_3 \rightarrow M_2O + H_2O(g) + 2CO_2(g)$ (5) $MCO_3 \rightarrow MO + CO_2(g)$ (6) $2Al(OH)_3 \rightarrow Al_2O_3 + 3H_2O(g)$ (7) $M_4SiO_4 \cdot XH_2O \rightarrow M_4SiO_4 + XH_2O(g)$ (8) $M_2SiO_3 \cdot XH_2O \rightarrow M_2SiO_3 + XH_2O(g)$ where M is a monovalent or divalent cation and X is an integer. Thus borax, hydrated borate salts, bicarbonates, carbonates, hydrated oxides, particularly of aluminum, silicates, metasilicates, and orthosilicates can be useful. The currently preferred inorganic material is alumina trihydrate ($Al(OH)_3$ or $Al_2O_3 \cdot 3H_2O$) due to its high proportion of chemically combined water which is stable at the coating and drying temperatures of the intumescent coating. In addition, the coating can include borax. Typically, the particle size of the inorganic materials ranges from about 0.5 to 100 micrometers. The coating of the invention includes about 20 to 35 parts by weight, preferably about 25 to 30 parts by weight, based on 100 parts by weight silicate, inorganic particles.

The hydrated metal silicate clay preferably is an aluminum silicate such as kaolin ($H_2Al_2Si_2O_8 \cdot H_2O$). The coating can comprise about 15 to 30 parts by weight, preferably 20 to 25 parts by weight, based on 100 parts by weight silicate, kaolin. Preferably the aqueous solution contains substantially equal parts of kaolin and the inorganic particulate material described above.

Upon exposure to fire temperatures, the substituents of the coating interact, in a manner not completely understood, to form a thermally insulative barrier which extinguishes and prevents reignition of fire. In particular, upon exposure to fire, the alkali metal silicate becomes fusible and the water in the silicate volatilizes to produce an expanding silicate foam. As exposure to fire temperatures continues, the foam releases the water locally extinguishing the fire and providing a cooling effect; the silicate residue of the foam contributes to the formation of the insulative barrier. During gas release the coating temperature is maintained substantially constant even though heat influx continues. Exposure to flame temperatures also causes the inorganic particulate material to undergo microexplosions. The microexplosions, which assist the silicate binder in stopping the spread of fire point by point, also provide a localized cooling effect by absorbing heat to break the chemical bonds of the inorganic particulate material and release the bound gas-forming moieties. In preferred embodiments, inorganic materials, e.g., alumina trihydrate and borax, which release their water of hydration at different temperatures are used to provide continuous fire protection over a wide range of temperatures. As fire temperatures exceed 1,200 degrees Fahrenheit, the hydrated metal silicate releases its water of hydration supplementing the protection afforded by the silicate binder and inorganic particles, and contributes an alumino-silicate residue to the formation of the barrier layer.

A variety of materials can be "fire-protected", i.e., protected against the deleterious effects of overheating caused by fire, using the coating composition of the present invention. Cellulosics, e.g., paper, panels, and wooden objects such as crates and boxes, metals, and foamed polymeric materials can be coated with the coatings to fabricate fire-protected products. Excellent results are obtained when the above-described intumescent coating is applied to metal substrates.

The fire-protected products of the invention can be prepared by coating a substrate material with a single aqueous mixture containing the materials discussed above in the given parts by weight. The surface of the substrate is coated, or impregnated, using techniques familiar to the art. Coating thicknesses of about 0.01 to 3 inches are preferred, 0.01 to 0.60 inches for metal substrates. Optimum coating thicknesses for various substrates may be empirically determined. Once applied, the aqueous mixture can be air or oven dried. To prevent water from washing or leaching the coating off, the fire protected material can receive a second water-insoluble coating. The second coating may include a water-insoluble metal sulfate such as calcium sulfate, i.e., gypsum. Cements, polymer laticies of acrylic or PVC, and other protective coatings may also be used.

Alternatively, the coating can be of multi-layer construction. Typically, the first layer is applied as an aqueous mixture having between about 5% to 75% (by weight) inorganic particulate material, preferably alumina trihydrate, and about 25% to 95% of the alkali metal silicate, preferably a regular viscosity grade. After drying, a second aqueous mixture having about 5% to 75% inorganic particulate material, preferably borax, and about 25% to 95% alkali metal silicate, preferably of higher viscosity than used in the first coating, is applied. To prevent water from washing or leaching off the outer, or both, layers a further water-insoluble coating may be applied.

Of course, both of the above fire-protected materials may be further protected by applying the above-discussed coatings to all external surfaces, in addition to those exposed directly to fire.

The invention will be more apparent from the following illustrative, non-limiting examples. Parts and percentages are by weight unless otherwise indicated.

EXAMPLE 1

An aqueous mixture having 200 parts Grade "N" sodium silicate, having a viscosity of 180 CPS from P.Q. Industries of Valley Forge, PA was mixed with 50 parts kaolin and 50 parts alumina trihydrate. To the aqueous mixture was added, with stirring, 30 parts of a solution of 20 parts Grade "C" sodium silicate, having a viscosity of 70,000 CPS from P.Q. Industries of Valley Forge, PA, and 10 parts borax. The procedure resulted in an aqueous solution which, when applied to a substrate and dried, acted as an intumescent coating.

The composition was applied as a coating over a 203 mm×203 mm steel "I" beam (52 kg/m) having three thermocouples affixed thereto. The thickness of the coating was about 0.50 inches. The "I" beam was then placed in an oven and the its temperature recorded continuously. The temperature of the "I" beam was plotted against time to obtain a thermal transmission profile for the beam. The results of the Experiment are presented in FIG. 1.

As shown in the FIGURE, the oven temperature was 1,900 degrees Fahrenheit. Upon exposure to the oven temperature, the substituent materials of the coating intumesced. After 60 minutes, the beam had a temperature 285 degrees Fahrenheit.

These results illustrate the thermal protection afforded to a steel substrate by the intumescent coating.

EXAMPLE 2

The composition of Example 1 was prepared and applied as a coating over an 0.130 gauge (0.1876 inch) aluminum plate. The thickness of the coating was about 0.07 inches.

Thermal transmission through the coating was tested by placing the coated surface in contact with a flame and sensing the temperature of the plate on the opposite side of the plate, i.e., the reverse side. The temperature increase of the plate was continuously recorded and plotted against time. The results of this Example are presented in FIG. 2.

As shown in the FIGURE, the flame temperature at the point of contact with the plate attained a constant temperature of about 2,000 degrees Fahrenheit after about one minute. The substituent materials of the coating intumesced upon contact with the flame. The reverse side of the plate exhibited a gradual temperature increase and after 13 minutes, 50 seconds had a temperature of 450 degrees Fahrenheit.

These results illustrate the advantageous thermal protection afforded to an aluminum substrate by the intumescent coating.

EXAMPLE 3

The composition of Example 1 was prepared and applied as a coating over an 0.130 gauge aluminum plate. The coating thickness was about 0.09 inches.

Thermal transmission through the coating was tested following the reverse side testing procedure of Example 2. The temperature increase of the plate was continuously recorded and plotted against time. The results of this Example are presented in FIG. 3.

As shown in the FIGURE, the flame temperature at the point of contact with the plate was about 2,000 degrees Fahrenheit after about one minute. Upon exposure to the flame, the substituent materials of the coating intumesced. The reverse side of the plate exhibited a steady temperature increase for about the first four minutes of the test. The reverse side temperature of the plate remained substantially constant at approximately 230 degrees Fahrenheit for the remaining six minutes of the test.

These results illustrate the thermal protection afforded to an aluminum substrate increases with the thickness of the intumescent coating.

EXAMPLE 4

Two solutions were prepared as follows:
Solution One:
  15 parts alumina trihydrate, having an average particle size of 10 micrometers, and 100 parts Grade "N" sodium silicate, having a viscosity of 180 CPS from P.Q. Industries of Valley Forge, PA;
Solution Two:
  15 parts borax,
  25 parts Grade "C" sodium silicate, having a viscosity of 70,000 CPS from P.Q. Industries of Valley Forge, PA.

A coating of Solution One was applied to a commercially available rigid foam panel. After Solution One was completely cured, Solution Two was applied to form a second coating. The total coating thickness varied, but was on the order of less than one-eighth inch.

The multi-coated foam panel then was subjected to a flame having a temperature of about 1800 degrees Fahrenheit for 10 minutes. The coating passed test ASTM E-84 (24 foot tunnel test) with a flame spread index of 5 and smoke density of zero.

EXAMPLE 5

The coating mixture of Example 1 was applied to one face of an aluminum plate approximately 0.063 inch thick and 4 square feet in area at a coating thickness of 0.025 inch. A thermocouple was placed in contact with the uncoated face. Next, the tip of the flame from a torch, having a temperature of about 2200° F., was left one-half inch from the coated surface for ninety minutes directly opposite the thermocouple. During exposure to the flame, the maximum temperature sensed by the thermocouple was 460° F.

It will thus be seen that the invention efficiently attains the objects set forth above, among those made apparent from the preceding description. In particular, the intumescent coating of the invention, comprising a mixture of the water-soluble alkali metal silicate, a hydrated metal silicate clay, and at least one inorganic particulate material provides an interactive system adaptable for use in producing varying degrees of fire protection to a variety of substrates.

The invention may be embodied in other specific forms without departing from the spirit and scope thereof, and accordingly, other embodiments are within the following claims.

Having described the invention, what is claimed as new and secured by Letters Patent is:

I claim:

1. A fire-protected material comprising a member having affixed to a surface thereto a coating consisting of a mixture of:
   a) a water soluble alkali metal silicate;
   b) at least one inorganic particulate material which, when exposed to a selected flame temperature, endothermically releases a nonflammable gas; and
   c) kaolin, said kaolin serving to improve the thermal resistance of said coating;

whereby said coating protects said member against fire temperatures by presenting an intumescent thermal barrier which substantially insulates said member from said flame temperatures, and is capable of forming a vitreous surface barrier when exposed to flame.

2. The material of claim 1 wherein said member is formed of a material selected from the group consisting of steel and aluminum.

3. The material of claim 1 wherein said member is a cellulosic material.

4. The material of claim 1 wherein said member is a foamed polymeric material.

5. The material of claim 1 further comprising a water-insoluble coating on an outer surface of said coating to protect against dissolution thereof upon exposure to water.

6. The material of claim 5 wherein said water-insoluble coating comprises calcium sulfate or a cement.

7. The material of claim 1 wherein said inorganic particulate material is selected from the group consisting of a hydrated aluminum oxide, hydrated borate, carbonates, bicarbonates, and mixtures thereof.

8. The material of claim 1 wherein said inorganic particulate material comprises alumina trihydrate.

* * * * *